United States Patent
Marquis (10) Patent No.: US 7,568,502 B2
(45) Date of Patent: Aug. 4, 2009

(54) COUPLING FOR A HYDRAULIC OR PNEUMATIC ASSEMBLY

(75) Inventor: Timothy T. Marquis, Lincoln, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 386 days.

(21) Appl. No.: 11/219,012

(22) Filed: Sep. 2, 2005

(65) Prior Publication Data

US 2006/0273580 A1  Dec. 7, 2006

Related U.S. Application Data

(60) Provisional application No. 60/686,340, filed on Jun. 1, 2005.

(51) Int. Cl.
*F16L 37/28* (2006.01)

(52) U.S. Cl. .............. 137/614.06; 137/614.04; 137/614.05; 137/627.5

(58) Field of Classification Search ........... 137/614.04, 137/614.05, 614.06, 614.11, 594, 595, 627.5; 251/149.6, 149.9, 231, 236, 243, 284; 285/124.5
See application file for complete search history.

(56) References Cited

U.S. PATENT DOCUMENTS

| | | | | |
|---|---|---|---|---|
| 2,484,924 A * | 10/1949 | Anderson | .................. | 251/149.6 |
| 3,680,591 A * | 8/1972 | Vik | .................. | 137/614.05 |
| 3,710,823 A * | 1/1973 | Vik | .................. | 137/594 |
| 3,881,514 A * | 5/1975 | Berg | .................. | 137/614.04 |
| 4,009,729 A * | 3/1977 | Vik | .................. | 137/614.05 |
| 4,074,698 A * | 2/1978 | Hobson et al. | .................. | 137/614.06 |
| 4,181,150 A * | 1/1980 | Maldavs | .................. | 137/614.06 |
| 4,222,411 A * | 9/1980 | Herzan et al. | .................. | 137/614.04 |
| 4,303,098 A * | 12/1981 | Shindelar | .................. | 137/614.06 |
| 4,373,551 A * | 2/1983 | Shindelar | .................. | 137/614.06 |
| 4,549,577 A * | 10/1985 | Kugler | .................. | 137/614.04 |
| 4,582,295 A * | 4/1986 | Kugler et al. | .................. | 251/149.6 |
| 4,881,573 A * | 11/1989 | Durant et al. | .................. | 137/614.04 |
| 5,005,877 A * | 4/1991 | Hayman | .................. | 285/315 |
| 5,896,889 A * | 4/1999 | Menard | .................. | 137/614.04 |
| 5,988,697 A * | 11/1999 | Arosio | .................. | 285/124.1 |
| 6,016,835 A * | 1/2000 | Maldavs | .................. | 137/614.05 |
| 6,453,945 B1* | 9/2002 | Schumacher et al. | ... | 137/614.06 |
| 6,701,959 B1* | 3/2004 | Flynn et al. | .................. | 137/625.65 |
| 6,869,060 B2* | 3/2005 | Barber et al. | .................. | 251/30.02 |

* cited by examiner

*Primary Examiner*—Stephen M Hepperle
*Assistant Examiner*—Craig Price
(74) *Attorney, Agent, or Firm*—Renner, Otto, Boisselle, & Sklar, LLP (57) ABSTRACT

A coupling (110) comprising a pair of female couplers (116) each independently movable within a respective housing bore (114) among an operating position, a release position, and a coupling position. When a female coupler (116) is moved to the coupling position, a stop member (136) moves the plunger of a pressure relief valve (124) to an open position to allow fluid to be released from the female coupler (116) prior to coupling a male coupler thereto. A cam member (126), which is used to move the respective female coupler (116) from the operating position to the release position, can move away from the plunger when the female coupler (116) is in the coupling position as the pressure relief valve (124) is held open by the stop member (136).

15 Claims, 8 Drawing Sheets

COUPLING FOR A HYDRAULIC OR PNEUMATIC ASSEMBLY

RELATED APPLICATION

This application claims the benefit of U.S. Provisional Patent Application No. 60/686,340 filed Jun. 1, 2005 under 35 U.S.C. §119(e). The entire disclosure of this provisional application is hereby incorporated herein by reference.

FIELD OF THE INVENTION

This invention relates generally to a coupling for a hydraulic or pneumatic assembly, the coupling comprising a housing and a pair of female couplers which are positioned within bores of the housing for coupling with corresponding male couplers.

BACKGROUND OF THE INVENTION

A coupling can be used with a hydraulic or pneumatic assembly to allow the selective connection of hydraulic or pneumatic lines. For example, a coupling can be used in a hook-up arrangement on an agricultural or industrial vehicle to operate an implement attached to or being towed by the vehicle. To this end, a coupling can comprise a housing and a pair of female couplers positioned within respective bores of the housing so that, when male couplers are coupled thereto, a flow path will be established between the male couplers and the supply/return lines of the assembly.

A female coupler can be movable between an operating position and a release position. In the operating position, a male coupler coupled to the female coupler will communicate with the supply/return line of the hydraulic or pneumatic assembly. In the release position, a male coupler can be released or "uncoupled" from the female coupler.

Lever-actuated cam members are commonly used to move the female coupler(s) from the operating position to the release position. In a coupling having a pair of female couplers, a lever moves the cam members to cause corresponding movement of the female couplers. In one known lever design, movement (i.e., rotation) of the lever's shaft results in parallel movement of the cam members and simultaneous interaction with the female couplers. In another known lever design, movement (i.e., pivoting) of the lever's shaft results in a see-saw movement of the cam members and independent interaction with the female couplers.

When uncoupling a male coupler from a female coupler, it is desirable to release pressure build-up within the female coupler prior to removal of the male coupler. This has been accomplished by the coupling incorporating (for each female coupler) a pressure relief valve movable from a closed position to an open position to prevent/permit the release of pressure from a flow passage inside the female coupler. With both the rotational lever design and the see-saw lever design, this can be accomplished by the cam member pushing the plunger of the pressure relief valve to the open position when the female coupler is moving towards the release position.

It is also often desirable to release pressure build-up within the female coupler prior to and/or during coupling of the male coupler thereto. With the rotational lever design, this has been accomplished by placing the female coupler in a coupling position whereat the cam member is abutted against a stop member thereby positioning the cam member to push the plunger and open the pressure relief valve. However, with the see-saw lever design, this arrangement is not possible, as such positioning of the cam member (if even possible) would result in the other cam member interacting with and moving its female coupler.

SUMMARY OF THE INVENTION

The present invention provides a coupling wherein the cam member can move away from the plunger when the female coupler is in its coupling position and the plunger is held in its open position by the stop member. This is accomplished by a stop member which is positioned relative to the plunger so that, regardless of the position of the cam member, it will engage the plunger when the female coupler is in the coupling position. A pair of these stop members can be incorporated into a coupling having a pair of female couplers and a see-saw lever design, thereby by allowing pre-coupling pressure relief which was not possible with the stop members of the prior art. The stop member(s) may also prove useful in a double-coupler device with a rotational lever design and could certainly be used in a single-coupler arrangement.

More particularly, the present invention provides a coupling for a hydraulic or pneumatic assembly comprising a housing having a bore and a female coupler movable with the bore among an operating position, a release position, and a coupling position. When the female coupler is in the operating position, a male coupler is coupled thereto, a flow path will be established with the supply/return line. When the female coupler is in the release position, the male coupler can be released (i.e., uncoupled) therefrom. When the female coupler is in the coupling position, the male coupler can be coupled thereto.

The coupling additionally comprises a pressure relief valve and a cam member. The pressure relief valve includes a valve plunger movable from a closed position to an open position respectively blocking and permitting the release of pressurized fluid from a flow passage inside the female coupler. The cam member initially moves the valve plunger from its closed position to its open position and then moves the female coupler from its operating position to its release position, thereby allowing a pressure release prior to removal of the male coupler.

The coupling further comprises a stop member that moves the plunger from its closed position to its open position when the female coupler is moved to its coupling position, thereby allowing a pre-coupling pressure release. When the female coupler is in its coupling position, the cam member can move away from the plunger as the plunger will be held in its open position by the stop member. The stop member can be movable relative to the housing and/or the stop member can be movable with the cam member. If a coupling has a see-saw lever design, the cam members can remain in the neutral position when one female coupler is in the coupling position, with pre-coupling pressure release still being accomplished.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

DETAILED DESCRIPTION

Figure 1:
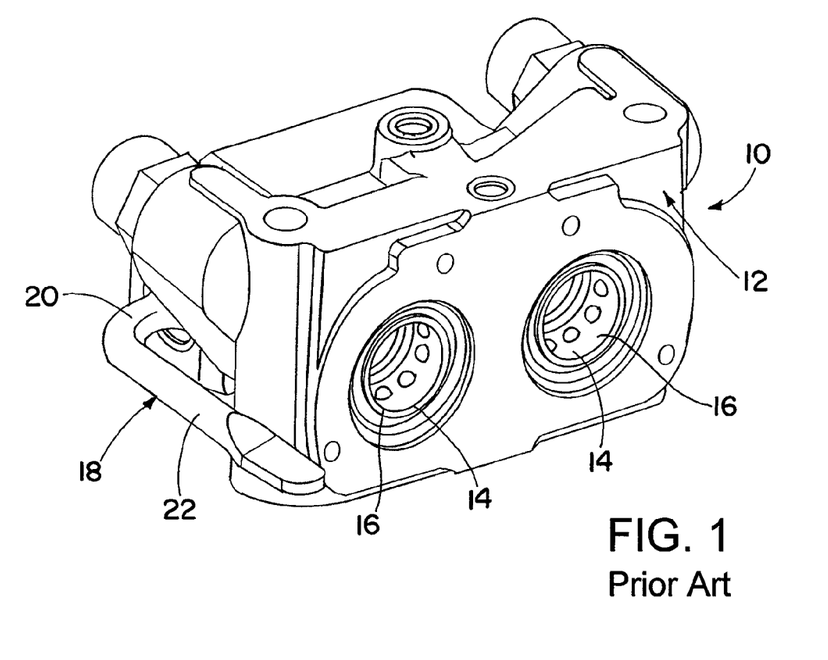
FIG. 1 is a perspective view of a coupler according to the prior art.

Referring now to the drawings, and initially to FIG. 1, a coupling 10 according to the prior art is shown. The coupling 10 comprises a housing 12 having a pair of bores 14, a pair of female couplers 16 one of which is positioned within each of the bores 14, and a lever 18. The lever 18 has a shaft 20 extending through the housing 12 and a handle 22 accessible from outside of the housing 12. Movement of the lever 18 (via the handle 22) results in rotation of the shaft 20 in a corresponding direction.

Figure 2:
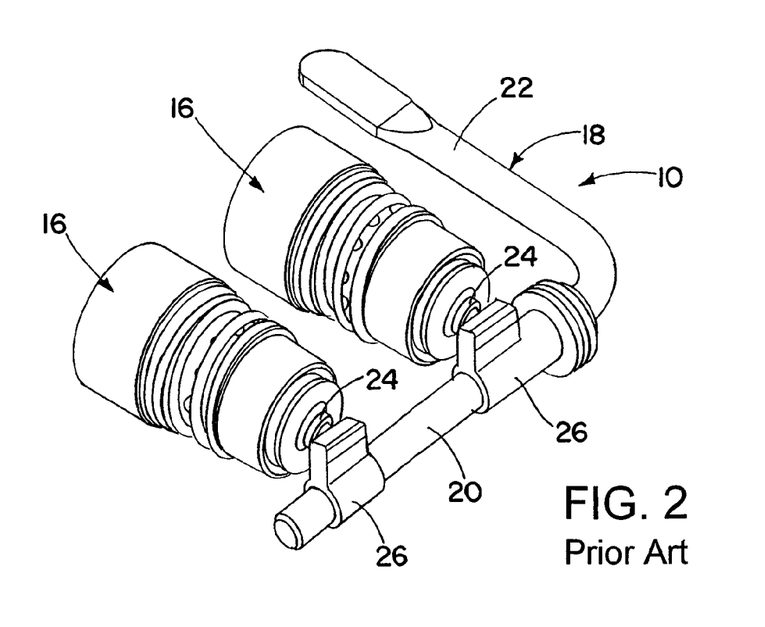
FIG. 2 is a perspective view of the non-housing components of the coupler of FIG. 1.

As can be seen by referring additionally to FIG. 2, the coupling 10 includes a pressure relief valve 24 and a cam member 26 associated with each of the female couplers 16. The cam members 26 are both carried by the shaft 20 and each interacts with the respective female coupler 16 and pressure relief valve 24. Movement (i.e., rotation) of the lever's shaft 20 results in parallel movement of the cam members 26 and simultaneous interaction with the couplers 16 and valves 24.

Figure 3:
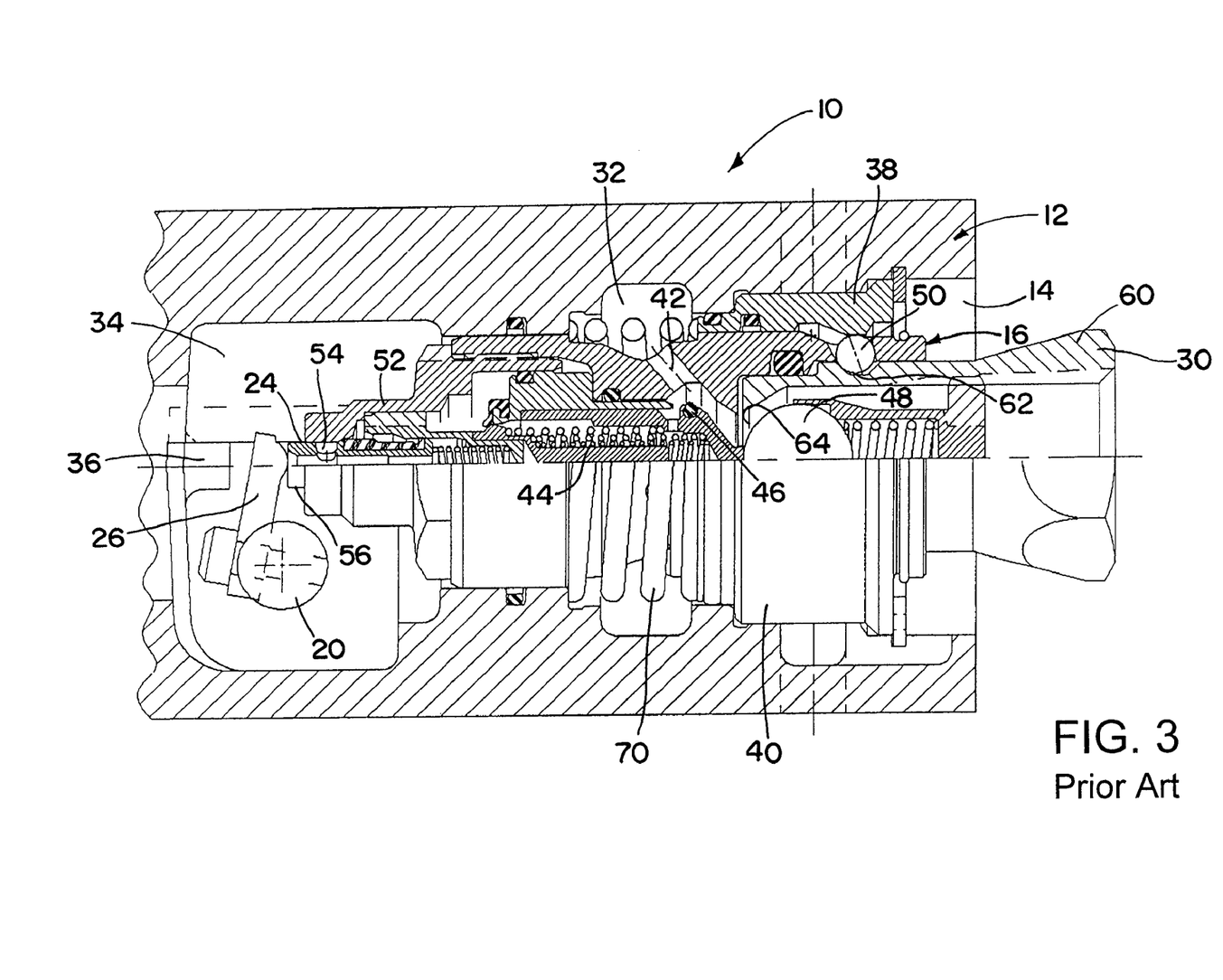
FIGS. 3-5 are cross-sectional views of the coupler of FIG. 1 and corresponding male couplers, the coupler being shown in an operating condition, a release condition, and a coupling condition, respectively.
Figure 4:
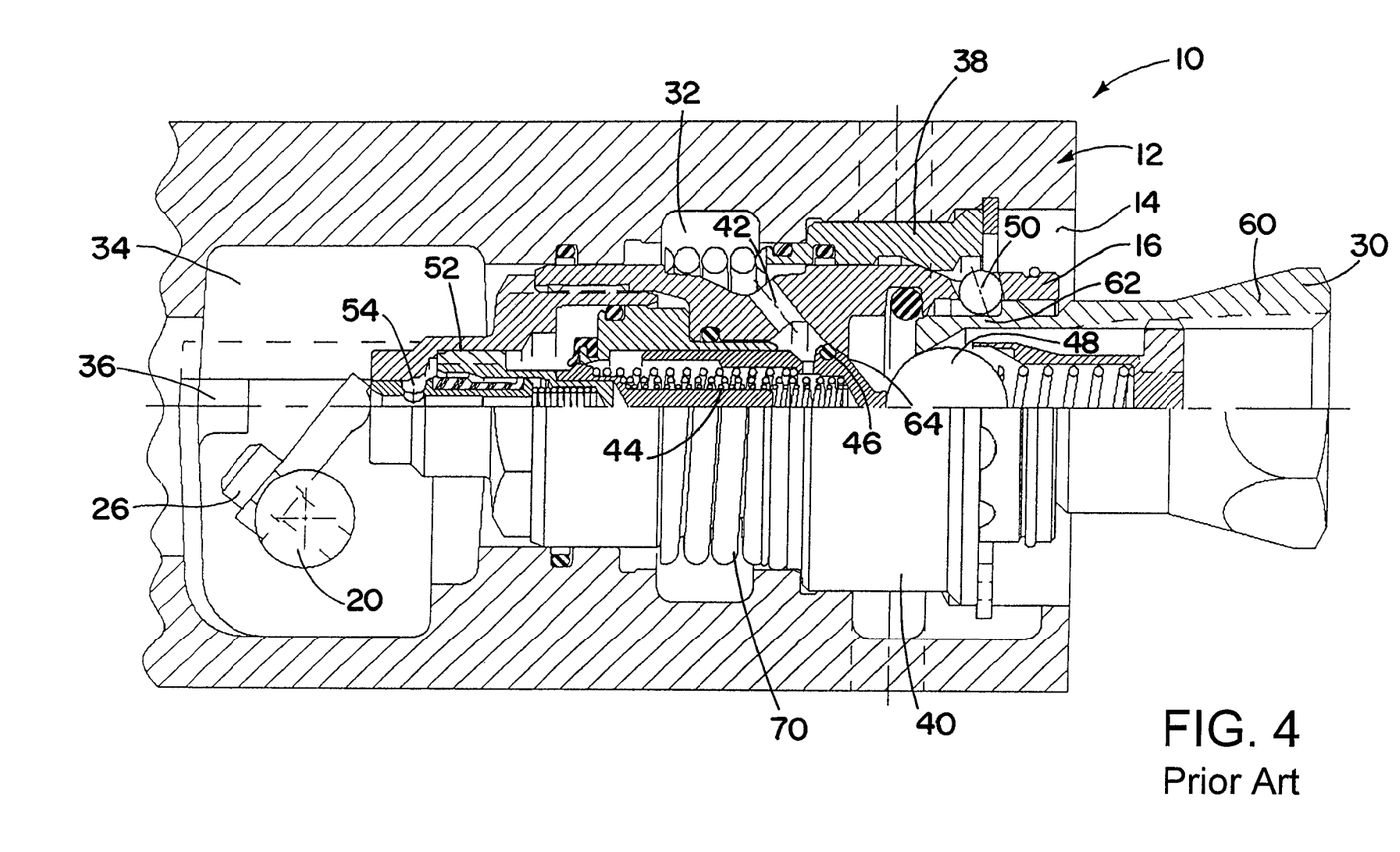
Figure 5:
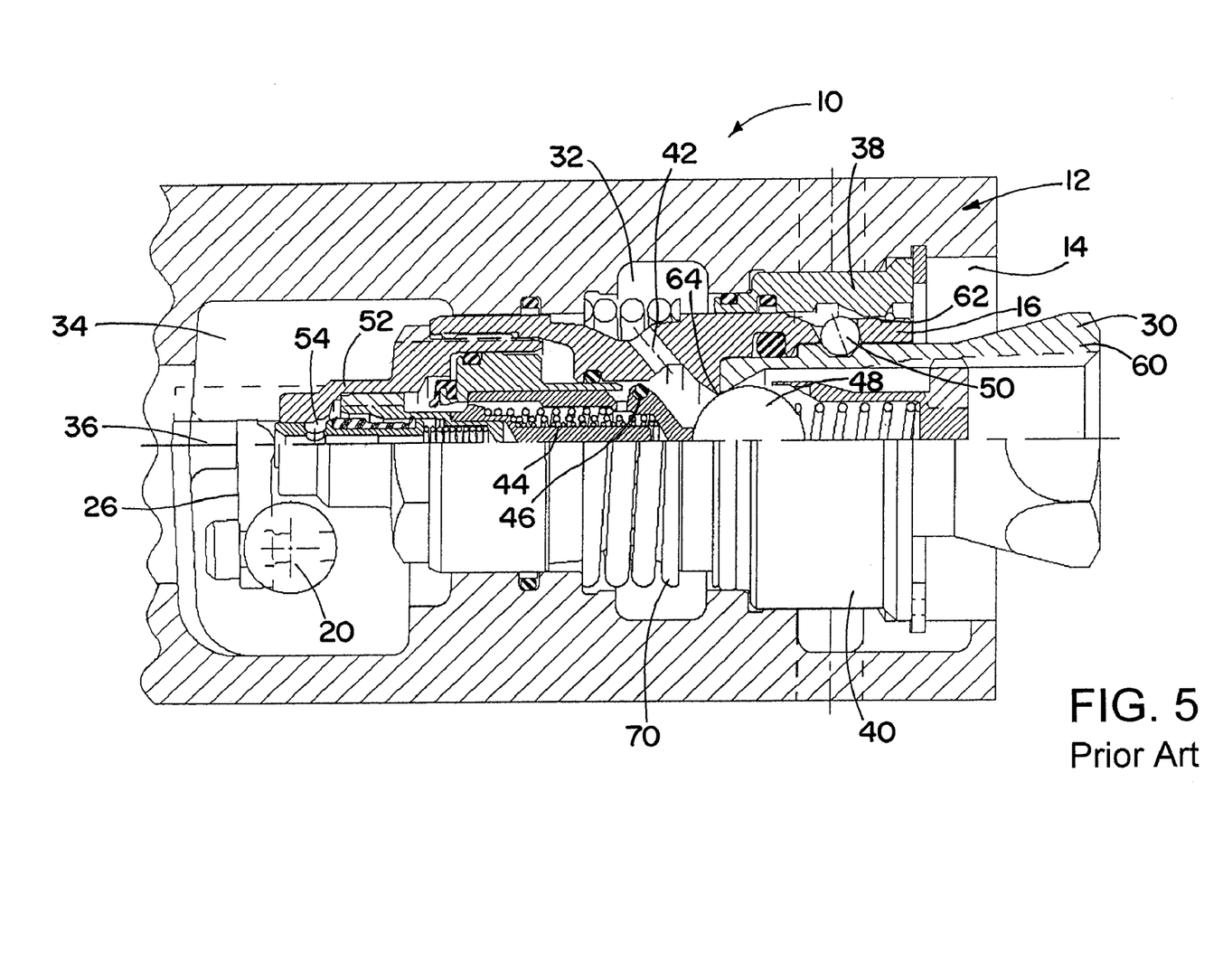

Referring now to FIGS. 3-5, the coupler 10 and corresponding male couplers 30 are shown in detail. The components (i.e., the female coupler 16, the pressure relief valve 24, the cam member 26, and the male coupler 30) within only one bore 14 of the housing 12 are visible in these drawings. However, because the non-housing components are essentially twin parts, a description of the movement and/or position of the visible components applies also to the movement and/or position of the hidden components.

As is explained in more detail below, the female coupler 16 is movable within the bore 14 among an operating position (FIG. 3), a release position (FIG. 4), and a coupling position (FIG. 5).

The housing 12 defines a pair of primary passageways 32. One passageway 32 communicates with one bore 14 and is connected to, for example, the supply line; the other passageway 32 communicates with the other bore 14 and communicates with, for example, the return line. The housing 12 also defines a chamber 34 at the end of the bores 14 and this chamber 34 can be connected to the sump of the pneumatic or hydraulic assembly. The shaft 20 of the lever 18 extends through the sump chamber 34 and each cam member 26 is positioned within the chamber 34 for interaction with its corresponding female coupler 16 and pressure relief valve 24. A stop member 36 is located within the sump chamber 34 behind the cam member 26 and a grooved sleeve 38 is positioned within the bore 14 near its receiving end.

The female couplers 16 each have a cylindrical receptacle 40 slidably positioned within the respective bore 14. The receptacle 40 defines a primary passage 42 which communicates with the primary passageway 32 in the housing 12. A shuttle (check valve member) 44 within the receptacle 40 moves between an open positions (FIGS. 3 and 5) and a closed position (FIG. 4). The shuttle 44 carries a ledge seal 46 and it is biased (e.g., spring biased) to its closed position. The ledge (check valve) seal 46 seals against a tapered valve seat surface at the interior or the receptacle 40 as shown in FIG. 4.

A series of locking members 50 (i.e., balls in the illustrated embodiment) are mounted on the circumference of the receptacle 40 in a manner allowing limited radial movement. The locking members 50 are movable into and out of engagement with different regions of the grooved sleeve 38 and also different regions of surface of the male coupler 30. (Compare FIGS. 3, 4 and 5.)

An end portion 52 of the receptacle 40 extends into the chamber 34 and is positioned for interaction with the respective cam member 26. The end portion 52 includes a flow passage 54 which is either sealed from the sump chamber 34 (see FIG. 3), or communicates therewith (see FIGS. 4 and 5).

The pressure relief valve 24 includes a valve plunger 56 slidably positioned within the end portion 52 of the receptacle 40. The plunger 56 is movable between a closed position whereat the passage 54 is sealed from the sump chamber 34 (see FIG. 3) and an open position whereat the passage 54 communicates with the sump chamber 34 (see FIGS. 4 and 5). The plunger 56 is biased to the closed position and, when in this position, its tip extends beyond the receptacle end portion 52 of the female coupler 16 and is situated for interaction with the cam member 26. The plunger 56 is pushed to the open position by the cam member 26 and, when in this position, its tip retracts into the receptacle end portion 52 of the female coupler 16.

The male couplers 30 each comprise a cylindrical body 60 which fits within the receptacle 40 of the respective female coupler 16. The outer surface of the body 60 includes a groove arrangement 62 which interacts with the locking members 50 of the female coupler 16. (Compare FIGS. 3 and 5 to FIG. 4). An opening in the end of the cylindrical body 60 communicates with the primary passage 42 in the female coupler 16 (and thus the primary passageway 32 to the supply/return line). A check valve ball 48 is biased against a tapered valve seat surface surrounding the opening for closing the opening when the male coupler is not coupled to the female coupler. When the shuttle 44 of the female coupler 16 is in the open position (FIG. 3) and the valve ball 48 is in an open position as shown in FIG. 3, fluid can flow between the male and female couplings. When the shuttle 44 is its closed position (FIG. 4), fluid cannot flow through the opening 64 as it is sealed/blocked by the ledge seal 46.

In FIG. 3, the coupler 10 is shown with the female coupler in the operating position. The locking members 50 lock the female coupler 16 to the housing 12 (via the sleeve 38) and lock the male coupler 30 to the female coupler 16 (via the grooves 62). The shuttle 44 is in the open position whereby fluid flows through the opening 64 in male coupler 30 to the primary passage 42 in the female coupler and thus to the primary passageway 32 in the housing 12. The cam member 26 is in a neutral position whereat it is not pushing against the female coupler 16, it is not pushing against the plunger 56, and it is not abutted against the stop member 36. The plunger 56 is in the closed position (and thus the bleed passage 54 is sealed) with its tip extending beyond the female coupler 16 and situated for interaction with the cam member 26.

In FIG. 4, the coupler 10 is shown with the female coupler 16 in the release position. The locking members 50 are no longer situated within their "locked" locations on the sleeve 38 and the male coupler 30 whereby the male coupler 30 can be withdrawn from the receptacle 40 of the female coupler 16. The shuttle 44 is in the first closed position and the ledge seal 48 seals the opening 64 and thus flow through the primary passage 42 and the primary passageway 32 is prevented. The cam member 26 is in a forward most position whereat it is pushing against the female coupler 16 and pushing against the plunger 56 to place it in the closed position. In this manner, the flow passage 54 is open to dump pressurized fluid from the female coupler 16 prior to release of the male coupler 30.

In FIG. 5, the coupler 10 is shown with the female coupler in the coupling position. The female coupler 16 and the male coupler 30 are latched together by the locking members 50 and the grooved arrangement 62, but the female coupler 16 is not latched to the housing 12 (via the grooved sleeve 38). The shuttle 44 is in the second closed position whereby the opening 64 is sealed by the check member 48 and thus flow through the primary passage 42 and the primary passageway 32 is prevented. The cam member 26 is abutted against the stop member 36 which causes the cam member 26 to push the plunger 56 the open position. In this manner, the flow passage 54 is open to dump pressurized fluid from the female coupler 16 prior to coupling of the male coupler 30 thereto.

Upon removal of the insertion force from the male coupler 30, a centering spring 70 returns the female coupler 16 to its latched position and thus the coupler 10 to the latched condition shown in FIG. 3.

Figure 6:
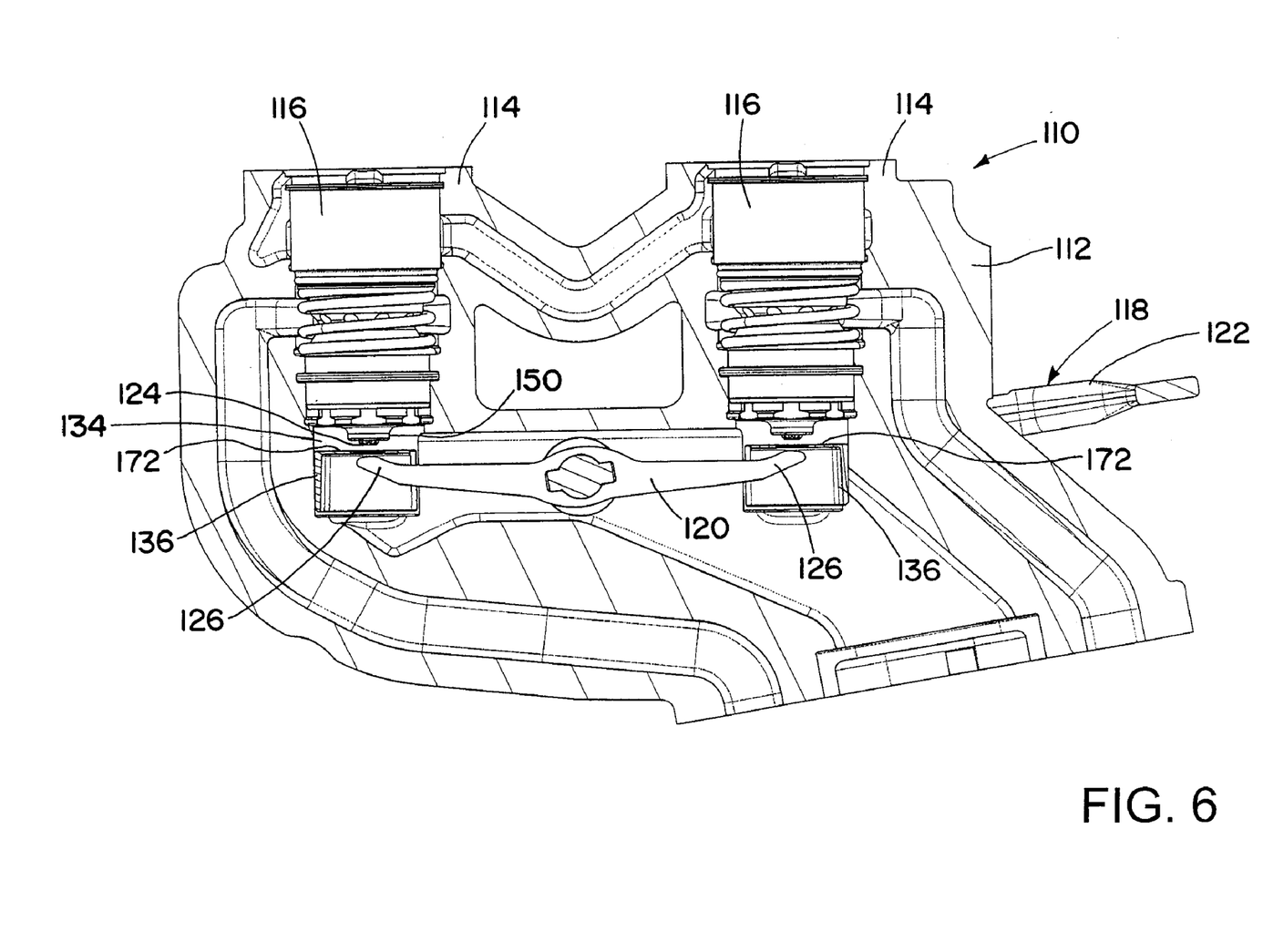
FIG. 6 is a cross-sectional view of a coupler according to the present invention.

Turning now to FIG. 6, a coupler 110 according to the present invention is shown. The coupler 110 is similar to the coupler 10 in many ways whereby like reference numerals, with 100 being added thereto, will be used for corresponding parts. However, in the coupler 110, the lever 118 comprises a shaft 120 which moves in a see-saw fashion with the cam members 126 being located on different sides of pivot point of the shaft 120. The handle 122 of the lever 118 can place both cam members 126 in a neutral position or it can move one of the two cam members 126 in a position to place the female coupling 116 in its release position. Thus, the lever 118 can move the respective female couplings 116 independently of each other.

When the one cam member 126 is so moved to move the corresponding female coupling 116 from the operating position to the release position, the cam member 126 can interact with the pressure relief valve 124. Specifically, it can push its plunger 150 to open the flow passage within the female coupler 116 and thereby dump pressurized fluid from the female coupler 116 prior to release of the male coupler. However, when the female coupler 116 is in the coupling position, the cam member 126 moves away from the plunger 150 whereby it cannot initiate the opening of the relevant flow passageway.

According to the present invention, the coupler 110 is provided with stop members 136. The stop member 136 allows the respective cam member 126 to move away from the plunger 150 when the female coupler 116 is in its coupling position (shown in FIG. 6A) while still holding the plunger 150 in the open position. Each stop member 136 is positioned relative to the plunger 150 so that, regardless of the position of the cam member 126, it will engage the plunger 150 when the female coupler 116 is in the coupling position.

Figure 6A:
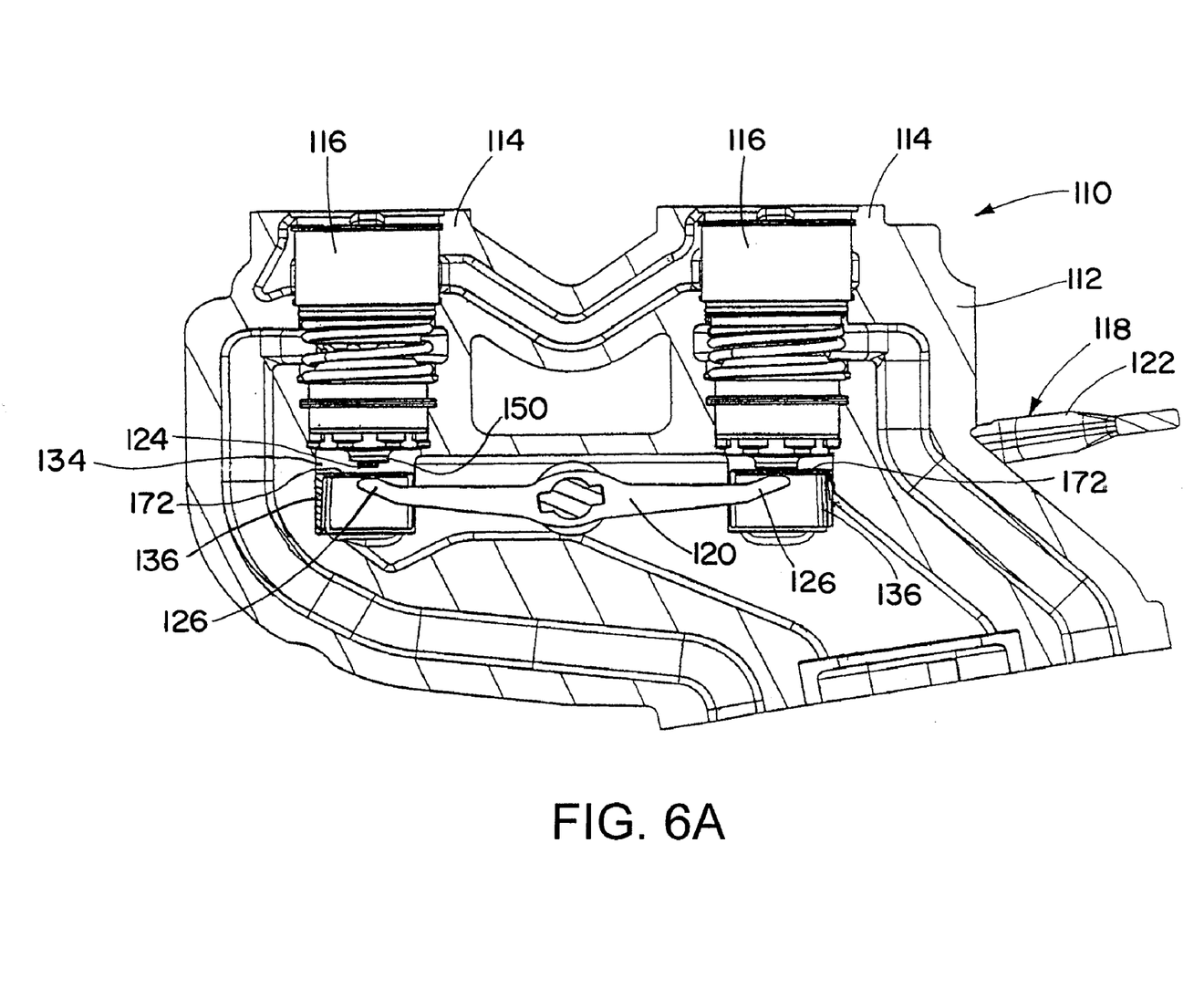
FIG. 6A is a cross-sectional view of the coupler of FIG. 6, showing the female coupling in a coupling position.
Figure 7:
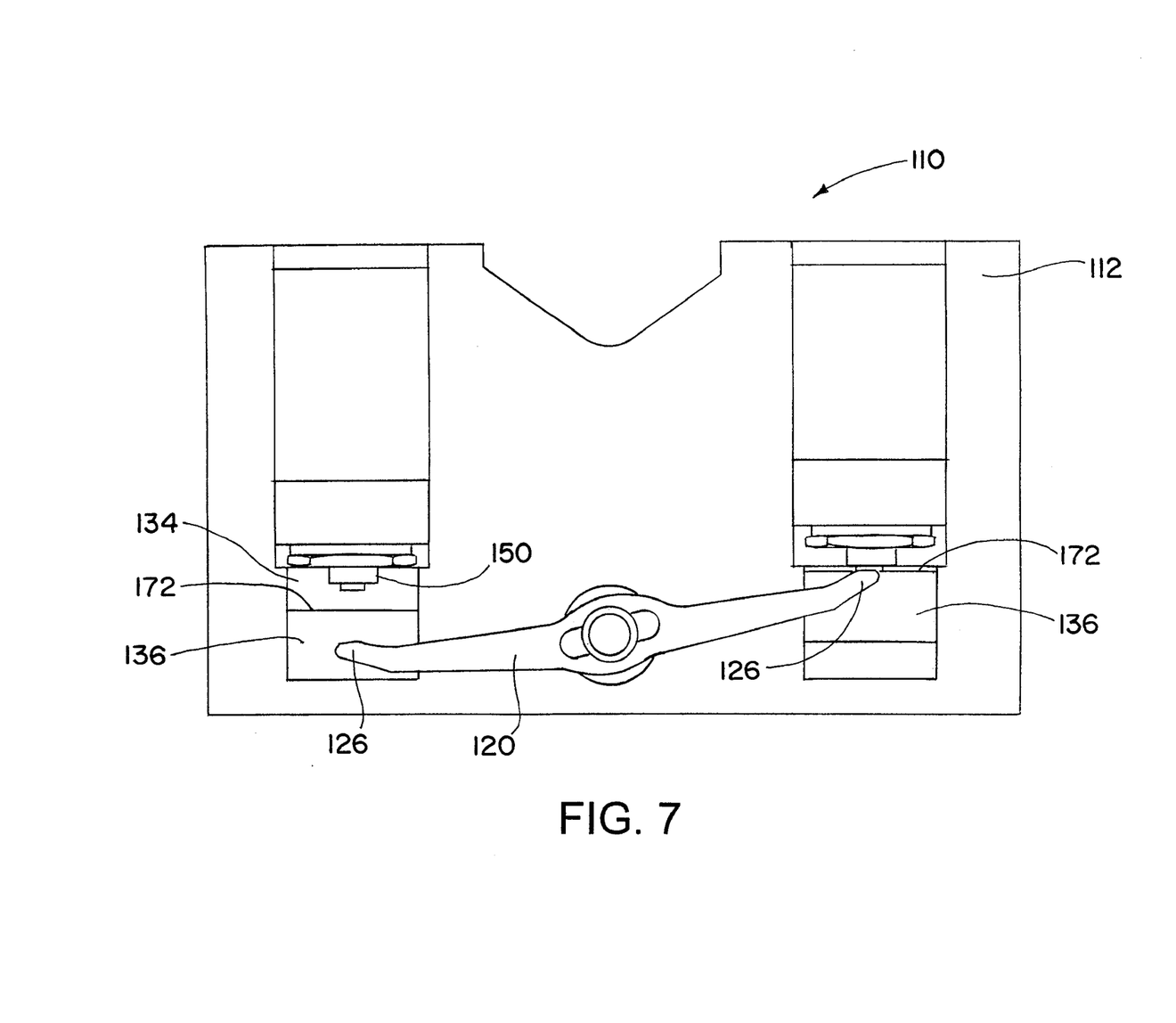
FIG. 7 is a schematic view of the coupler of FIG. 6, showing the lifting of a stop member during actuation of cam member.

In the illustrated embodiment, this is accomplished by stop members 136 which are movable within the sump chambers 134. When one cam member 126 is moved to place the female coupler 116 in the release position, the stop member 136 is moved therewith towards the female coupler 116 and plunger 150. However, when a cam member 126 is in an idle position, or in a position corresponding to the other cam member 126 being moved to the release position, the stop member 136 remains in a position to contact the plunger 150 if the female coupler 116 is moved to the coupling position.

Figure 8:
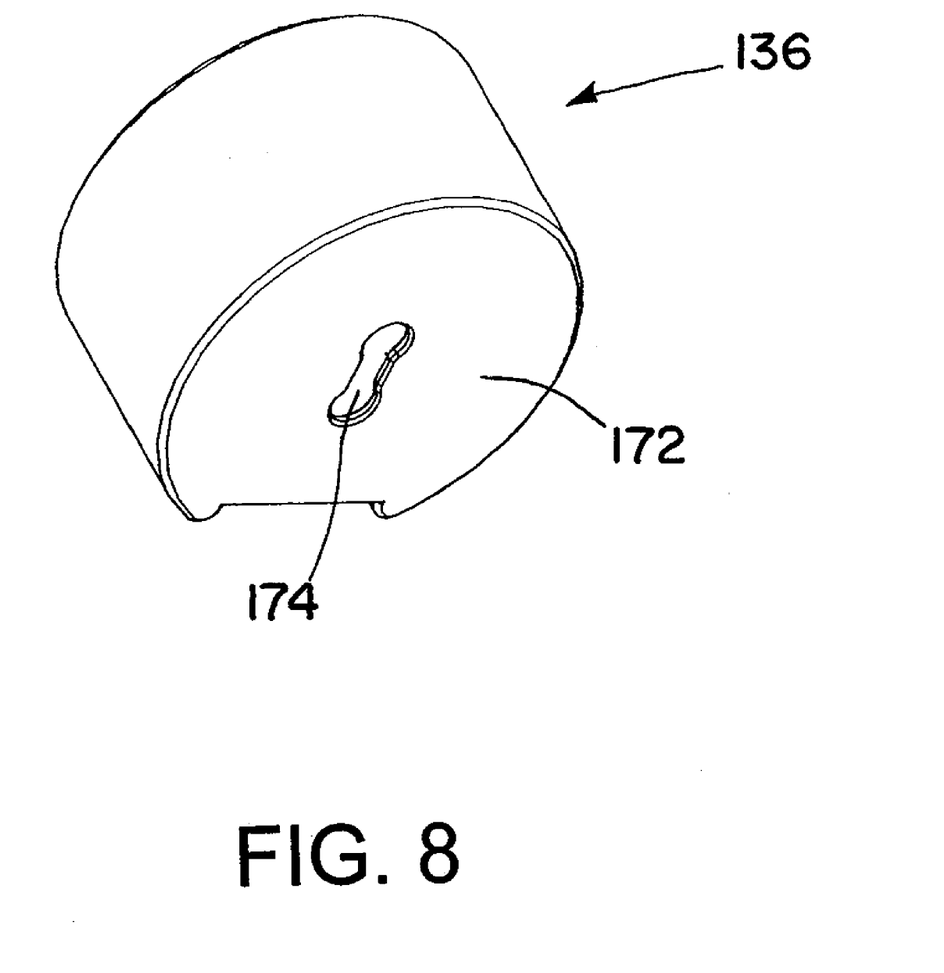
FIG. 8 is a perspective views of the stop member.

As is best seen by referring to FIG. 8, the stop members 136 can each have a cap-like shape including a plunger-engaging surface 172. The surface 172 can be provided with an opening (or openings) 174 or other means to allow the passage of fluid therethrough. In this manner, fluid released from the female coupling 116 can be efficiently routed through the sump chamber 134. Alternatively, the stop members 136 could remain stationary relative to the housing 112 and the cam members 124 could pass through an appropriate opening in the stop member 136 when moving the female couplers 116 from the latched position to the release position.

One may now appreciate that the present invention provides a coupling wherein the cam member can move away from the plunger when the female coupler is in its coupling position and the plunger is still held in its open position by the stop member. With particular reference to a coupling incorporating a see-saw lever design, the stop members of the present invention allow pre-coupling pressure relief which was not possible with the stop members of the prior art. Additionally or alternatively, the stop member may also prove useful in dual-coupler arrangement with a rotational lever design and/or a single-coupler arrangement.

Although the invention has been shown and described with respect to certain preferred embodiments, it is obvious that equivalent and obvious alterations and modifications will occur to others skilled in the art upon the reading and understanding of this specification. The present invention includes all such alterations and modifications.

What is claimed is:

1. A coupling for a hydraulic or pneumatic assembly comprising:
   a housing having a bore;
   a female coupler movable within the bore between an operating position whereat, when a male coupler is coupled thereto, the male coupler is retained in the female coupler, a release position whereat the male coupler can be released from the female coupler, and a coupling position whereat the male coupler can be coupled to the female coupler;
   a pressure relief valve that includes a plunger movable from a closed position to an open position respectively blocking and permitting release of pressurized fluid from a flow passage inside the female coupler;
   a cam member movable to initially move the valve plunger from its closed position to its open position and then to move the female coupler from its operating position to its release position, thereby allowing the pressure relief valve to release pressurized fluid from the flow passage of the female coupler prior to removal of the male coupler; and
   a stop member for moving the plunger from its closed position to its open position when the female coupler is moved to its coupling position, thereby allowing the pressure relief valve to release pressurized fluid from the flow passage of the female coupler prior to coupling of the male coupler;
   wherein the cam member can move away from the plunger when the female coupler is in its coupling position and the plunger is held in its open position by the stop member.

2. A coupler as set forth in claim 1, wherein the stop member is movable relative to the housing.

3. A coupler as set forth in claim 1, wherein the stop member is movable with the cam member.

4. A coupler as set forth in claim 1, wherein locking members lock the female coupler to the housing when the female coupler is in the operating position.

5. A coupler as set forth in claim 1, wherein the housing includes a sump chamber and wherein the flow passage in the female coupler communicates with the sump chamber when the plunger is in the open position.

6. A coupler as set forth in claim 1, wherein the stop member includes a surface which pushes the plunger to the open position and wherein this surface includes an opening for the fluid released from the flow passage in the female coupler to pass therethrough.

7. A coupler as set forth in claim 1, further comprising another bore in the housing, another female coupler, another pressure relief valve, another cam member, and another stop member.

8. A coupler as set forth in claim 7, wherein the cam members are movable by a lever.

9. A coupler as set forth in claim 7, wherein the lever can only move one female coupler from the operating position to the release position at a time.

10. A coupler as set forth in claim 7, wherein the lever comprises a rod pivotal about a pivot point and wherein the cam members are carried by the rod on opposite sides of the pivot point.

11. A female coupler assembly wherein a cam member can move away from a pressure relief valve plunger when a female coupler is in a coupling position and the plunger is held in an open position by a stop member, wherein the stop member is positioned relative to the plunger so that, regardless of the position of the cam member, the stop member will engage the plunger when the female coupler is in the coupling position.

12. A female coupler assembly as set forth in claim 11, wherein the stop member is movable relative to the housing.

13. A female coupler assembly as set forth in claim 11, wherein the stop member is movable with the cam member.

14. A female coupler assembly as set forth in claim 11, wherein locking members lock the female coupler to a housing when the female coupler is in the operating position.

15. A female coupler assembly as set forth in claim 11, wherein the stop member includes a surface which pushes the plunger to the open position and wherein this surface includes an opening for the fluid released from the flow passage in the female coupler to pass therethrough.

\* \* \* \* \*